March 22, 1938.  C. E. OLSON  2,111,801
DYNAMOMETER
Filed Aug. 20, 1936
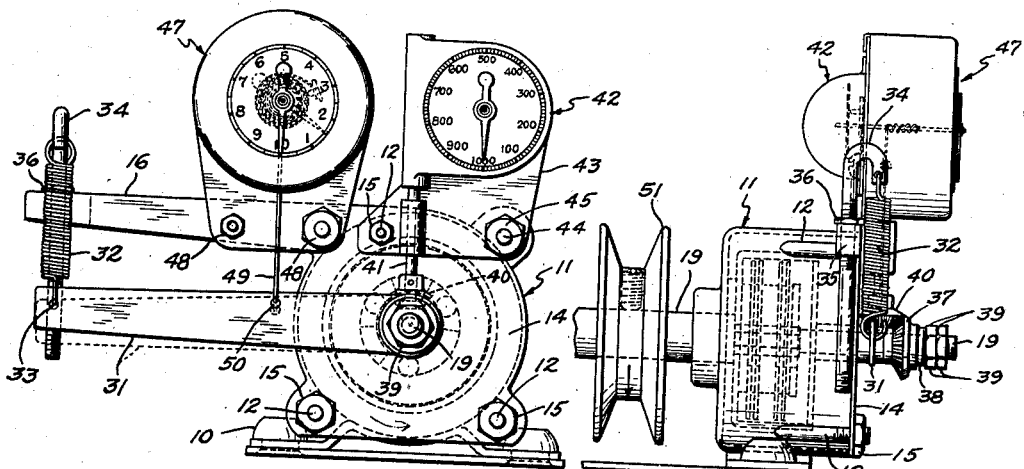
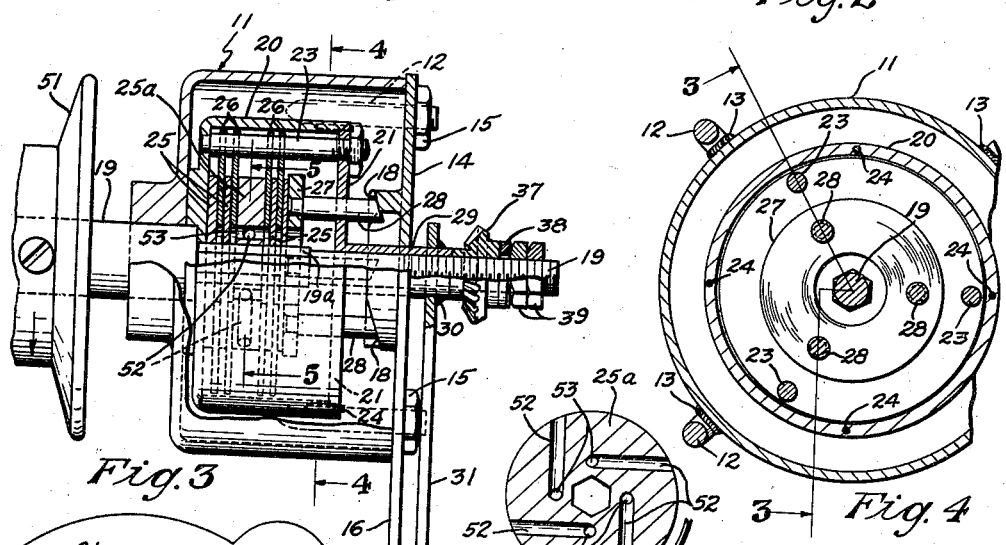
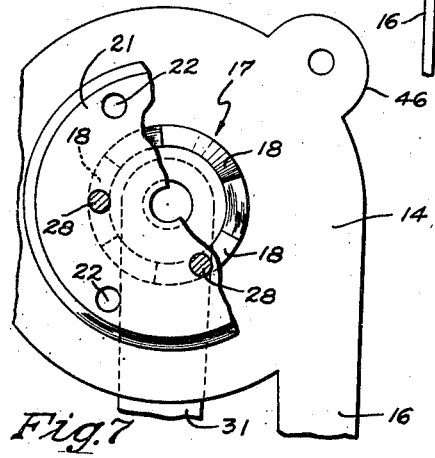
INVENTOR
Charles E. Olson
BY
Wooster & Davis
ATTORNEYS Patented Mar. 22, 1938

2,111,801

UNITED STATES PATENT OFFICE 2,111,801

DYNAMOMETER

Charles E. Olson, Bridgeport, Conn.

Application August 20, 1936, Serial No. 96,932

10 Claims. (Cl. 265—24)

This invention relates to new and useful improvements in dynamometers, and has for an object to provide a dynamometer constructed to automatically adjust itself to take care of expansion of parts due to heat whereby the friction between such parts remains uniform in the amount to which the device is set.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 1 is an end elevational view of the improved dynamometer;

Fig. 2 is a side elevational view thereof taken looking from the left in Fig. 1;

Fig. 3 is a view partly in section and partly in elevation, on an enlarged scale, the section being substantially along the line 3—3 of Fig. 4;

Fig. 4 is a sectional view taken substantially along the line 4—4 of Fig. 3;

Fig. 5 is a sectional view taken substantially along the line 5—5 of Fig. 3, being through a friction disc employed;

Fig. 6 is a detail view showing a friction disc and its driving connection with a shaft; and Fig. 7 is a view showing a cam means employed.

Referring in detail to the drawing my improved dynamometer is shown as including a base 10 mounting a housing or casing 11. Such housing is fixed to the base. Bolts 12 welded or otherwise secured to the housing as at 13 extend through a plate 14, and nuts 15 on said bolts rigidly secure the plate in place. Formed with or rigidly secured to the plate 14 is a laterally extending arm 16 the function of which will later be described. Plate 14 closes one end of the housing 11 and within the latter the plate carries a cam means 17 including a plurality of cam faces 18.

Extending through the housing 11 is a rotatable shaft 19, and about such shaft within the housing but also independent of the shaft is a drum 20 one end of which is closed by a plate 21. This plate has openings 22 accommodating bolts 23 by means of which the plate is secured in place, these bolts being secured at their inner ends to the drum 20, and pins 24 may be provided for the purpose of assisting in properly locating the plate on the drum. Friction discs 25 are disposed on the shaft 19 within the drum, and while these discs may be secured or fixed to the shaft in any desired manner, as here shown a portion 19a of the shaft is made non-circular, in the present case hexagonal (see Figs. 5 and 6), in transverse section, and the discs are formed with similarly shaped openings receiving the shaft whereby as the shaft rotates the discs are carried with it.

The bolts 23 above referred to carry or mount friction plates 26 within the drum 20, and such plates have center openings or holes so that the plates clear the shaft within the housing and such plates are arranged in alternate relation to the discs 25. As the shaft 19 rotates there is a friction between the discs 25 and the plates 26 if there is pressure on the discs in a direction longitudinally of shaft 19. A follower comprising a ring 27 is provided to be pressed against the discs and plates so as to press them together and produce a controllable or adjustable friction between them. Secured to this follower are a plurality of pins 28 extending through the drum closure plate 21 and engaging the respective cam surfaces 18 of the cam means 17. Any relative movement of the pins 28 and the cams bringing the ends of the pins 28 against the higher portions of the cam surfaces 18 causes the follower 27 to press the discs and plates 25 and 26 tighter together, and relative movement in the opposite direction reduces this pressure. In the present construction drum 20 carrying the plate 21 and pins 28 is rotatable or turnable relative to plate 14 and cams 18 but of course this arrangement may be reversed.

Drum 20 and plate 21 include a sleeve 29 about a portion of the shaft 19 and which sleeve extends out through the plate 14 closing the end of the housing 11. Rigidly secured to the extending portion of such sleeve by any suitable means, such for example as solder or weld metal 30, is an arm 31 extending along beneath the arm 16. Owing to the connection described it will be apparent that any turning of the drum 20 will be transmitted to and result in turning of the arm 31. A coil spring 32 has its lower end connected to the outer end portion of the arm 31 as at 33 and the upper end of the spring is secured to a hook or bar member 34. Member 34 passes through an eye 35 carried by the outer end portion of the upper stationary arm 16, and a nut 36 is adjustable on said member to control the distance it may pass through such eye, and therefore adjustment of such nut results in shifting of member 34 vertically and in adjustment of the tension of spring 32, and therefore the friction on the discs and plates and the resistance to operation of the device or the power absorbed.

Beyond the outer end of the sleeve portion 29 of the drum 20 a bevelled gear 37 is secured to the shaft 19, being held in place as by lock washers 38 and nuts 39. This gear meshes with a similar gear 40 on a vertical shaft 41 of a speedometer or revolution indicator 42, carried by a bracket 43 attached to the plate 14. For the purpose of attaching the bracket 43 one of the bolts and nuts 12 and 15 cooperates with a bolt 44 and a nut 45 the former passing through an ear 46 provided on plate 14 for that purpose. Any other suitable means of mounting the indicator may be used. An indicator 47 is mounted on the stationary arm 16 by bolts 48 and has one end of a flexible element 49 attached to the arm 31 as at 50. The indicator 47 is so calibrated that downward movements of the arm 31 and the pull of this arm register on the indictor for instantaneous reading.

A pulley 51 is attached to the shaft 19 and forms means through which power from the motor or the like to be tested may be applied to the shaft. However, it will be clear that any other type of coupling may be used for like purpose the pulley being shown only by way of example.

By adjustment of the nut 36 to move the member 34 upward through the eye 35 the spring 32 may be tensioned as desired and will draw upward on the arm 31 thereby rocking the drum 20 and the pins 28 relative to the cam 17 causing the pins to ride up onto higher portions of the cam surfaces 18. This results in the follower 27 forcing the plates 26 and discs 25 together to increase the pressure and thus the frictional engagement between them. It will thus be seen that the friction produced between the plate and the discs may be adjusted by adjusting the spring 32 and set to the amount desired.

Assuming the spring 32 to be properly adjusted for any given friction between discs 25 and plates 26, the motor, engine, shaft, etc., the power of which is to be measured, is coupled with the pulley 51 resulting in rotation of the shaft 19 and with it the discs 25. As the discs 25 rotate they tend through friction with plates 26 to carry the plates 26 with them resulting in a certain rocking movement of the drum 20 and a downward rocking of the arm 31 against the tendency of spring 32 to hold it in place. This movement continues until the tension of the spring equals the pull of arm 31 due to the friction between discs 25 and plates 26. When this happens further movement of arm 31 stops and a uniform friction between discs 25 and plates 26 is maintained. Deflection of the arm 31 is registered on the indicator 47 in pounds of work and the length of such arm is known, and the R. P. M. of the shaft is shown on the indicator 42. Therefore the H. P. applied may be readily computed.

However, the friction between the discs 25 and plates 26 as they slide on each other generates heat which heats up the plates and discs and causes them to expand somewhat which in turn tends to increase the pressure between the plates and discs and tends to cause them to bind together. If no means is provided to compensate for this it is evident the discs and plates would soon bind or burn out. On the other hand it will be seen that in the present arrangement as the plates and discs expand the increased friction between them will cause a slight further movement to be imparted to the drum 20 and this further movement of the drum shifts the pins 28 a short distance on the cams 18 toward their lower surfaces. As the pins move down the cams the pressure on follower 27 and the discs 25 and plates 26 is correspondingly reduced so that it is automatically brought back to what it would be if there had been no expansion of the plates and discs. Thus the pressure with which the plates and discs are held together is relieved so as to remain normal or the pressure set, and a true reading may be obtained although the discs and plates have expanded due to heat. This also prevents the friction plates binding or burning out due to increased pressure or friction and therefore increased heating as the device operates. It will be understood the downward movement of arm 31 sufficient to compensate for the expansion of the plates and discs due to the heating, will ordinarily be small and this will cause a corresponding increase in the tension of spring 32, but the tension of the spring and the pull of arm 31 due to the friction between the plates and discs soon equalize each other and an equilibrium is quickly established which is maintained throughout the operation, so that the pull on the spring, or its deflection which is proportional to this pull, taken with the speed of rotation is an indication of the power applied.

My work with the improved dynamometer has shown that the increased movement of the drum 20 and arm 31 required to relieve the pressure back to normal is so slight as to be hardly perceptible on the indicator 47. From the foregoing it will be understood that the device of the invention is self adjusting to the extent that when the pressure of contact between the plates and discs is increased due to expansion of such plates and discs by reason of their heating up in use, the pressure caused by the follower 27 pressing the plates and discs together is relieved to compensate for or in accordance with the increase in pressure due to such expansion of the plates and discs.

The drum 20 in its lower portion contains a substantial quantity of oil and to provide for the distribution of this oil one or more of the discs, as for example, the middle relatively thick disc 25a (see Figs. 3 and 5) is provided with holes 52 opening through its peripheral edge and at their inner ends communicating with transverse branches 53. Thus as the disc rotates in the direction indicated by the arrow 54 the holes 52 pick up quantities of the oil in the lower portion of the drum and the oil is distributed by passing out through the transverse passages 53.

Having thus set forth the nature of my invention, what I claim is:

1. In combination, a rotatable member, a second member mounted for limited movements, contacting friction elements secured to said rotatable member and to said second member respectively, means controlled by movement of the second member in one direction for forcing said elements together to develop a set friction between them, and said means being operable on movement of the second member in the opposite direction by increased pressure of the elements caused by expansion due to heating of the elements to correspondingly release the pressure on the elements whereby to have the friction between the elements remain uniform in said set amount.

2. In combination, a rotatable member, a substantially stationary member, discs fixed to said rotatable member, plates fixed to said substantially stationary member and alternating with said discs, a follower urging said plates and discs together to develop a friction between them, pins on said follower, cam means engaging said pins, adjustable spring means controlling the engagement of said pins and cam means and thereby the force with which the follower urges the plates and discs together, and said discs and plates being so arranged that friction between them tends to turn the follower and pins in a direction to cause the pins to move down the cams to thus release the pressure on the follower to correspond with the increased friction between the plates and discs caused by their expansion due to heat, whereby to have the friction between the plates and discs remain uniform in accordance with the adjustment of said adjustable spring means.

3. In combination, a rotatable shaft, a support mounted for turning movement independent of said shaft, discs fixed to the shaft, plates fixed to the support and alternating with said discs, means operable by relative turning movement of said support in one direction for forcing said plates and discs together to develop a predetermined friction between them, and said means operating to automatically correspondingly release said plates and discs by turning movement in the opposite direction by increased friction between the plates and discs as they expand due to heat, whereby to have the friction between the plates and discs remain uniform in said predetermined amount.

4. In combination, a rotatable shaft, a drum about and independent of said shaft, discs fixed to the shaft, plates fixed to the drum and alternating with said discs, a follower, pins on said follower, a fixed cam engaging said pins, a fixed arm, an arm rigid with said drum, a spring connecting said arms and adjustable to act through the second arm to move the pins relative to the cam to cause the follower to press the plates and discs together to produce a predetermined friction between them, and said drum and second arm being movable in the opposite direction as said friction increases on heating and expanding of the discs and plates whereby to shift the pins relative to the cam and relieve the pressure of the follower on the plates and discs in accordance with the increase of pressure due to such expansion whereby to have the friction between the plates and discs remain uniform in the amount determined by the setting of the spring connecting said arms.

5. In combination, a rotatable shaft, a drum about and independent of the shaft, discs fixed to the shaft, plates fixed to the drum and alternating with said discs, a follower forcing said plates and discs together, cam means controlling said follower, an adjustable means controlling the relation between the follower and cam means and thereby controlling the pressure with which the plates and discs are forced together, and said means including a spring to permit of automatic adjustment of the relation of said follower and cam means as the plates and discs expand due to heat whereby to have the friction between the plates and discs remain constant.

6. In combination, a rotatable shaft, a drum about and independent of the shaft, discs fixed to the shaft, plates fixed to the drum and alternating with said discs, a follower, pins on said follower, a fixed cam engaging said pins, a fixed arm, an arm rigid with said drum, and a spring connecting said arms and adjustable to act through the second arm to move the pins relative to the cam to cause the follower to press the plates and discs together to produce a predetermined friction between them.

7. In a dynamometer, a rotatable shaft, a drum about and independent of said shaft, discs fixed to the shaft, plates fixed to the drum and alternating with said discs, a follower, pins on said follower, a fixed cam engaging said pins, a fixed arm, an arm rigid with said drum, a spring connecting said arms and adjustable to act through the second arm to move the pins relative to the cam to cause the follower to press the plates and discs together to produce a predetermined friction between them, said drum and second arm being movable in the opposite direction as said friction increases due to heating and expanding of the discs and plates whereby to shift the pins relative to the cam and relieve the pressure of the follower on the plates and discs in accordance with the increase of pressure due to such expansion whereby to have the friction between the plates and discs remain uniform in the amount determined by the setting of the spring connecting said arms, an indicator connected with said second arm to show the torque applied thereto, and a speedometer driven from said shaft.

8. In a dynamometer, a rotatable shaft, a drum about and independent of the shaft, contacting friction elements secured to the shaft and drum respectively, a follower, pins on said follower, a fixed cam engaging said pins, a fixed arm, an arm rigid with said drum, a spring connecting said arms and adjustable to act through the second arm to move the pins relative to the cam to cause the follower to press the friction elements together to produce a predetermined friction between them, an indicator connected with said second arm to show the torque applied thereto, and a speedometer driven from said shaft.

9. In combination, a rotatable shaft, a drum about and independent of said shaft, discs fixed to the shaft, plates fixed to the drum and alternating with said discs, means operable by movement of the drum in one direction for forcing said plates and discs together to develop a predetermined friction between them, said means being arranged to automatically correspondingly release the pressure on movement of the drum in the opposite direction by increased friction between the discs and plates as they expand due to heat, whereby to have the friction between them remain uniform in said predetermined amount, said drum adapted in its lower portion to contain oil, and one of said discs having openings therein to pick up and distribute quantities of such oil as the disc is rotated with the shaft.

10. In combination, a rotatable shaft, a drum about and independent of the shaft, contacting friction elements fixed to the shaft and the drum respectively, a follower, a cam controlling the position of said follower, a fixed arm, an arm rigid with said drum, and a spring connecting said arms and adjustable to act through the second arm to cause relative movement of the cam and follower whereby to cause the latter to press the friction elements together to produce a predetermined friction between them.

CHARLES E. OLSON.